United States Patent [19]

Sawa et al.

[11] Patent Number: 5,722,305
[45] Date of Patent: Mar. 3, 1998

[54] SYSTEM FOR GENERATING DIFFERENCE IN SPEED BETWEEN LEFT AND RIGHT WHEELS OF VEHICLE

[75] Inventors: Yasuhiro Sawa; Makoto Nakano; Tetsuro Hamada, all of Saitama, Japan

[73] Assignee: Honda Giken Kogyo Kabushiki Kaisha, Tokyo, Japan

[21] Appl. No.: 714,578

[22] Filed: Sep. 16, 1996

[30] Foreign Application Priority Data

Sep. 18, 1995 [JP] Japan ................................ 7-238600

[51] Int. Cl.⁶ ................................................. F16H 37/06
[52] U.S. Cl. ................................................. 74/665 T; 74/650
[58] Field of Search ........................... 477/1, 35; 74/650, 74/665 GA, 665 T, 325, 665 R, 364; 180/6.2

[56] References Cited

U.S. PATENT DOCUMENTS

| | | | |
|---|---|---|---|
| 4,984,482 | 1/1991 | Shibahata | 74/665 T |
| 5,103,948 | 4/1992 | Sato et al. | 477/1 |
| 5,341,893 | 8/1994 | Fukui et al. | 74/650 |

FOREIGN PATENT DOCUMENTS 5-131855  5/1993  Japan.

*Primary Examiner*—Charles A. Marmor
*Assistant Examiner*—Sherry Lynn Estremsky
*Attorney, Agent, or Firm*—Armstrong, Westerman, Hattori, McLeland & Naughton

[57] ABSTRACT

A gearbox mounted between axles for left and right follower wheels of a vehicle includes a countershaft parallel to the axles. The countershaft is rotated at a speed greater than those of the right axle by speed-increasing gears. The countershaft and the left axle are capable of being connected to each other through first and second shifting gears and a first hydraulic clutch and through third and fourth shifting gears and a second hydraulic clutch. The first and second hydraulic clutches are disposed back-to-back between the first and third shifting gears and therefore, the size of the entire gearbox can be reduced. Moreover, since the first and second hydraulic clutches are mounted on the countershaft which is rotated at the higher speed, the necessary torque transmitting capacities of the first and second hydraulic clutches can be decreased, leading to reduced sizes of the first and second hydraulic clutches.

5 Claims, 4 Drawing Sheets

1

SYSTEM FOR GENERATING DIFFERENCE IN SPEED BETWEEN LEFT AND RIGHT WHEELS OF VEHICLE

BACKGROUND OF THE INVENTION

1. Field of the Invention

The present invention relates to a system for generating a difference in speed between left and right wheels of a vehicle by connecting the left and right wheels to each other by a gearbox.

2. Description of the Related Art

A left and right wheel speed difference generating system is disclosed in Japanese Patent Application Laid-open No. 5-131855.

With the above left and right wheel speed difference generating system, by controlling the engaged states of a speed-increasing clutch and a speed-decreasing clutch which are mounted in the gearbox, torque can be transmitted from an inner wheel to an outer wheel during turning of the vehicle to generate a driving force in the outer wheel and to generate a braking force in the inner wheel, thereby enhancing the turning performance, and torque can be transmitted from the outer wheel to the inner wheel during turning of the vehicle to generate a braking force in the outer wheel and to generate a driving force in the inner wheel, thereby enhancing high-speed stability.

The known wheel speed difference generating system has a structure in which the speed-increasing clutch and the speed-decreasing clutch are coaxially disposed adjacent one another between input and output shafts or two output shafts of a parallel two-shaft gearbox. A shifting gear is integrally provided around an outer periphery of a clutch outer portion, and a clutch inner portion is connected to the input shaft or the output shaft.

If the speed-increasing clutch and the speed-decreasing clutch are mounted on the input shaft or the output shaft of the gearbox in the above manner, the following problem is encountered: the torque of the input shaft or the output shaft is transmitted directly to the clutch and for this reason, the necessary torque transmitting capacity of the clutch is increased, resulting in an increased size of the gearbox. Moreover, another problem is that since the shifting gear is provided around the outer periphery of the clutch outer portion, the outside diameter of the clutch is further increased to bring about a further increase in size of the gearbox.

SUMMARY OF THE INVENTION

Accordingly, it is an object of the present invention to reduce the size of the gearbox in the left and right wheel speed difference generating system.

To achieve the above object, according to a first aspect and feature of the present invention, there is provided a system for generating a difference in speed between left and right wheels of a vehicle, by connecting the left and right wheels to each other by a gearbox, wherein the gearbox includes: a countershaft disposed in parallel with axles of the left and right wheels; first and second speed-increasing gears for increasing the number of rotations of one of the axles to transmit the rotation of the one axle to the countershaft; a first shifting gear relatively rotatably carried on the countershaft; a second shifting gear fixedly mounted on the other axle and meshed with the first shifting gear; a third shifting gear relatively rotatably carried on the countershaft; a fourth shifting gear fixedly mounted on the other axle and meshed with the third shifting gear; a first clutch mounted on the countershaft for coupling the first shifting gear to the countershaft; and a second clutch mounted on the countershaft for coupling the third shifting gear to the countershaft, the first and second clutches being disposed adjacent one another between the first and third shifting gears.

With such an arrangement, the first and second clutches are mounted on the countershaft to which a smaller torque is transmitted because the countershaft is rotated at a speed greater than that of the axles. Therefore, the torque transmitting capacity of the clutch can be decreased to reduce the size of the clutch, as compared with the case where the first and second clutches are mounted on the axles to which a larger torque is transmitted because the axles are rotated at a lower speed. Moreover, since the first and second clutches are disposed adjacent one another between the first and third shifting gears, the size of the entire gearbox can be also reduced to provide a reduced empty weight and an enhanced load-carrying ability of the vehicle.

According to a second aspect and feature of the present invention, in addition to the first feature, the outside diameter of the first shifting gear is less than the outside diameter of a clutch outer portion of the first clutch, and the outside diameter of the third shifting gear is less than the outside diameter of a clutch outer portion of the second clutch.

With the second feature, the radial sizes of the first and second clutches can be reduced to provide a reduction in size of the entire gearbox.

According to a third aspect and feature of the present invention, in addition to the first feature, the wheel speed difference generating system further includes a hydraulic pump for supplying a working oil to the first and second clutches, which is driven by the countershaft.

With the third feature, the number of revolutions of the hydraulic pump can be increased by driving the hydraulic pump by the countershaft to insure a sufficient amount of oil is discharged even during traveling of the vehicle at a low speed, as compared with the case where the hydraulic pump is driven by the axle.

The above and other objects, features and advantages of the invention will become apparent from the following detailed description of a preferred embodiment taken in conjunction with the accompanying drawings.

DETAILED DESCRIPTION OF THE PREFERRED EMBODIMENT

The present invention will now be described by way of an embodiment with reference to the accompanying drawings.

Figure 1:
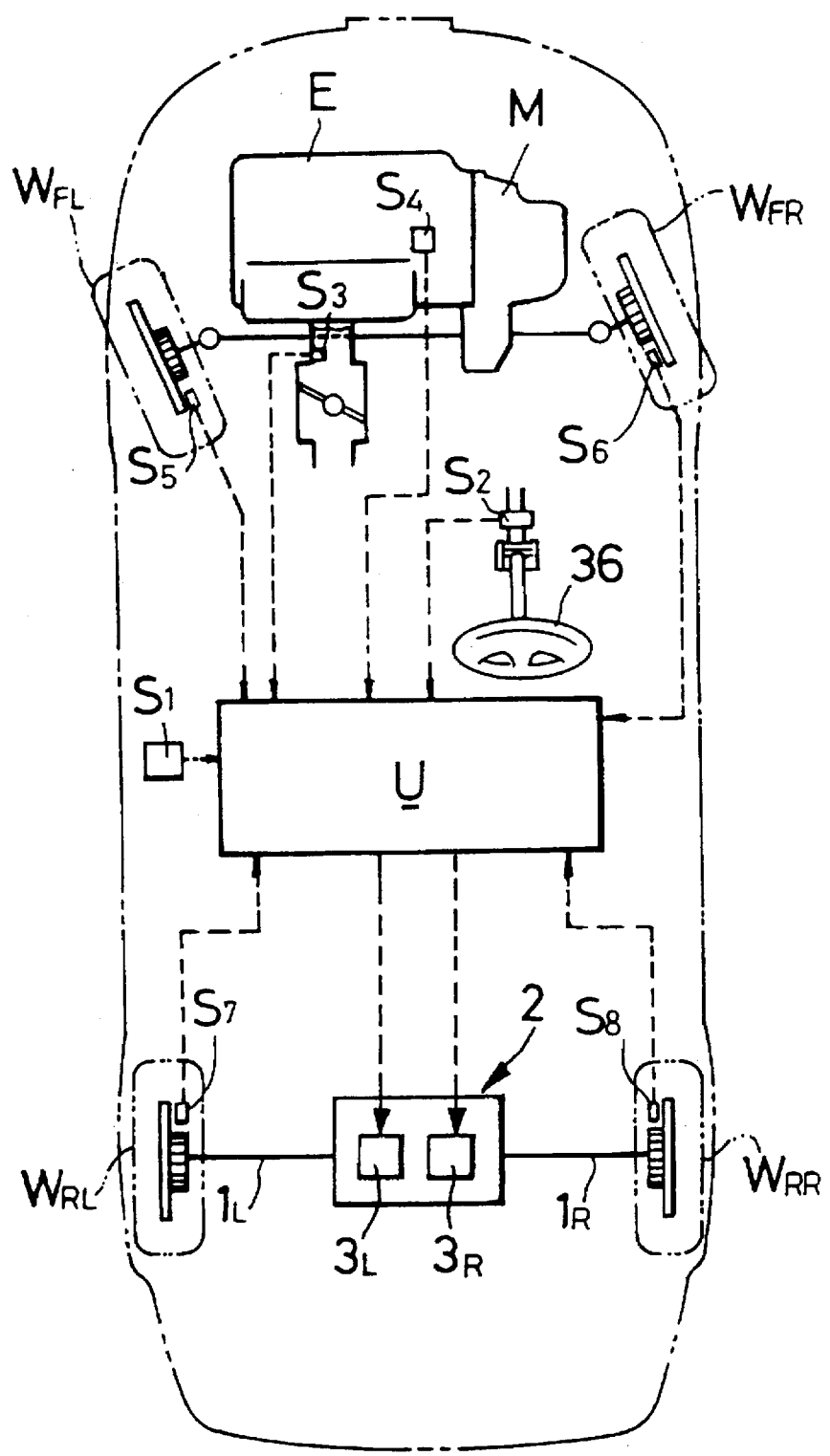
FIG. 1 is a diagrammatic illustration of the entire arrangement of a front engine and front drive vehicle equipped with a left and right wheel speed difference generating system.
Figure 2:
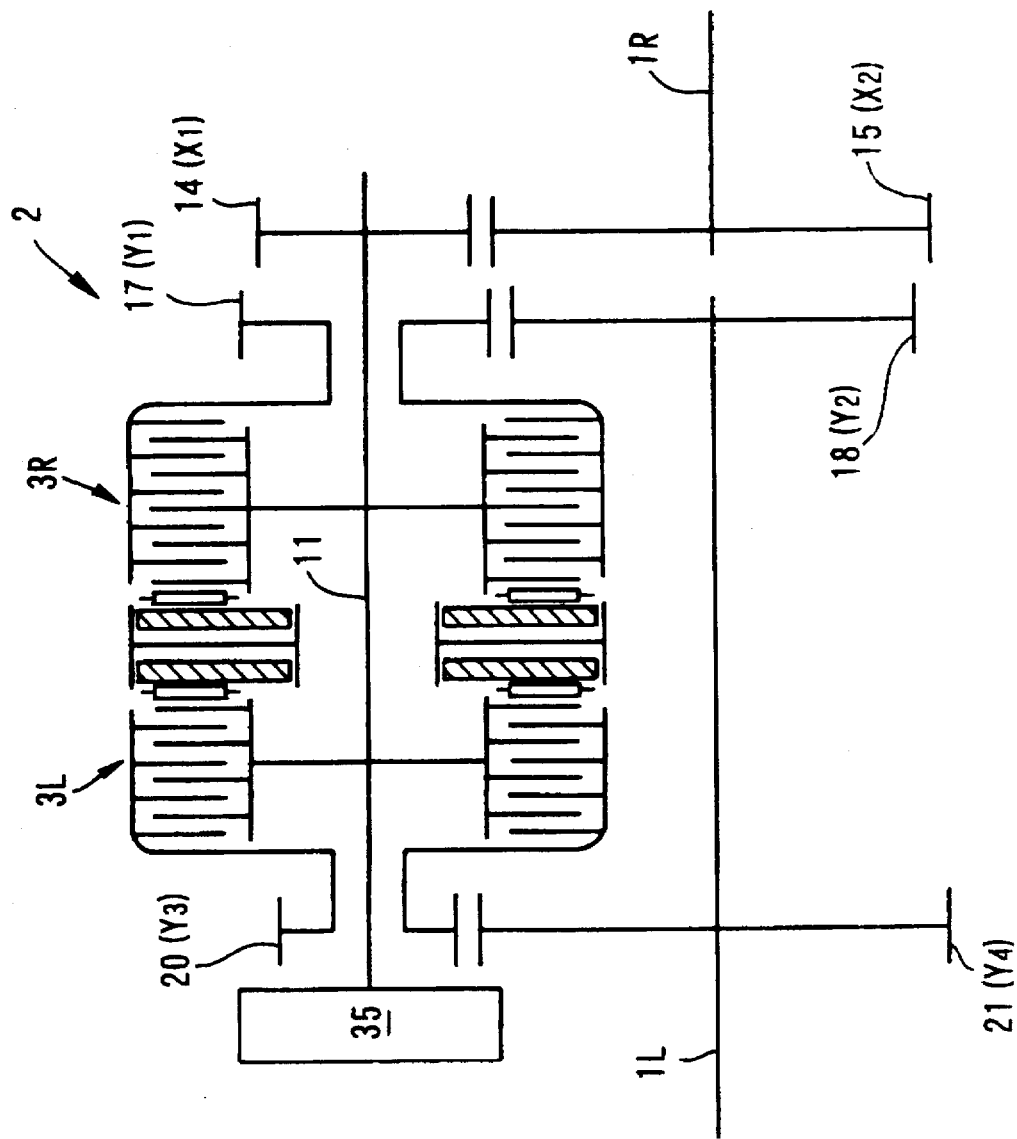
FIG. 2 is a skeleton illustration of a gearbox.

FIGS. 1 to 4 illustrate an embodiment of the present invention. As shown in FIGS. 1 and 2, a transmission M is connected to a right end of an engine E mounted horizontally at a front portion of a vehicle body, and a left front wheel $W_{FL}$ and a right front wheel $W_{FR}$ as driven wheels are driven by the engine E and the transmission M. A gearbox 2 is mounted between a left rear wheel $W_{RL}$ and a right rear wheel $W_{RR}$ as follower wheels for connecting the left and right rear wheels $W_{RL}$ and $W_{RR}$, so that the left and right rear wheels $W_{RL}$ and $W_{RR}$ are rotated at different speeds. The gearbox 2 is provided with a first hydraulic clutch $3_R$ and a second hydraulic clutch $3_L$. When the first hydraulic clutch $3_R$ is brought into an engaged state, the number of revolutions of the right rear wheel $W_{RR}$ is decreased, while the number of revolutions of the left rear wheel $W_{RL}$ is increased. When the second hydraulic clutch $3_L$ is brought into an engaged state, the number of revolutions of the left rear wheel $W_{RL}$ is decreased, while the number of revolutions of the right rear wheel $W_{RR}$ is increased.

Figure 3:
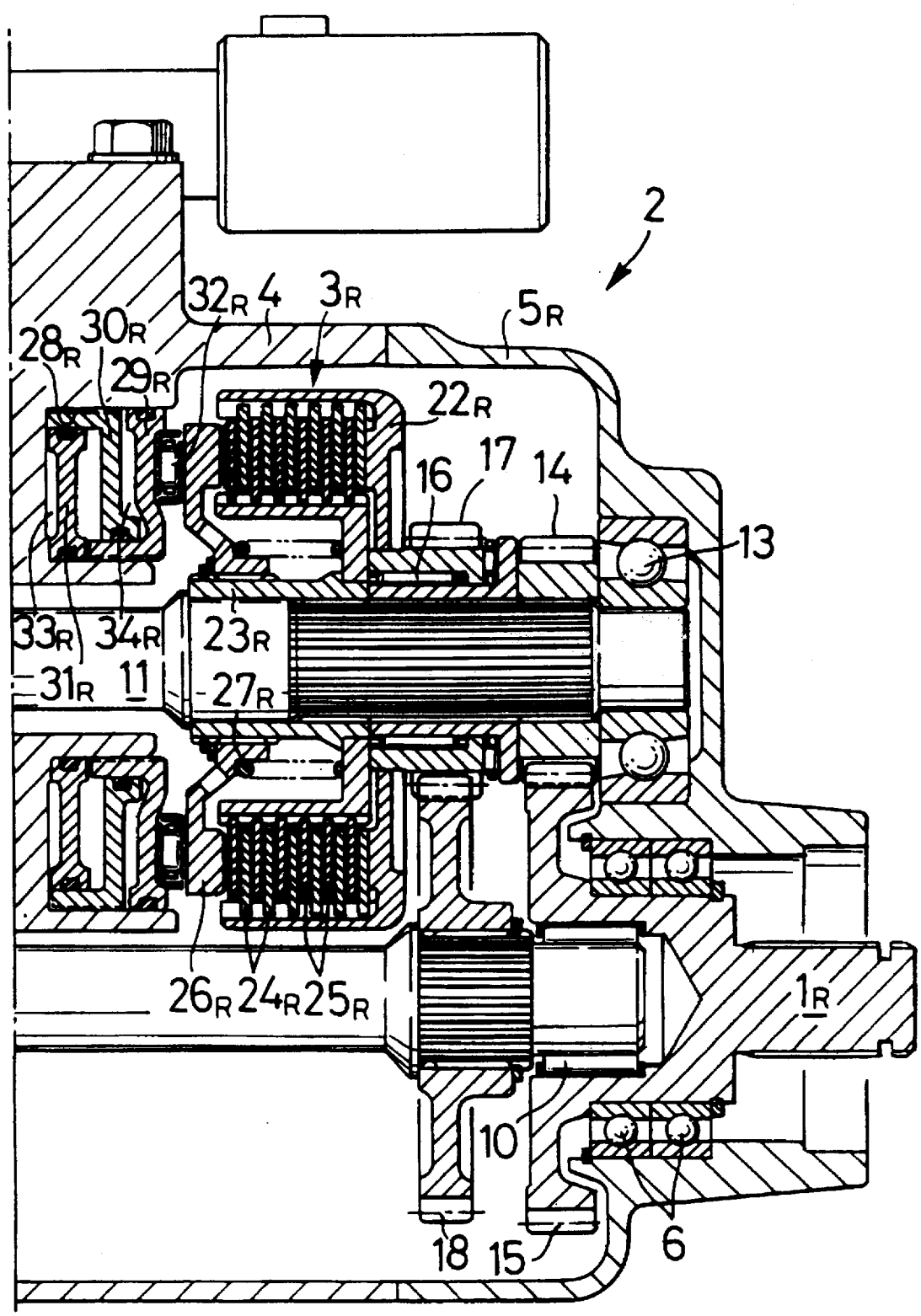
FIG. 3 is a sectional view of right half of the gearbox.

The structure of the gearbox 3 will be described below with reference to FIGS. 2 and 3.

The gearbox 2 includes a center housing 4, and a left housing $5_L$ and a right housing $5_R$ are coupled to left and right opposite end faces of the center housing 4. A right axle $1_R$ is carried in the right housing $5_R$ with ball bearings 6, 6 interposed therebetween, and a left axle $1_L$ is carried in a pump cover 8 with ball bearings interposed therebetween. The pump cover 8 is fixed within the left housing $5_L$ through bolts 7 with a roller bearing 10 incorporated in a recess which opens into an end face of the right axle $1_R$. Therefore, the left and right axles $1_L$ and $1_R$ are located coaxially and can be rotated at different speeds.

A countershaft 11 is supported at its right and left ends in the pump cover 8 and the right housing $5_R$ through ball bearings 12 and 13, respectively. The counter shaft 11 is disposed parallel to the left and right axles $1_L$ and $1_R$ and above the left and right axles $1_L$ and $1_R$. A first small-diameter gear 14 (having a number $X_1$ of teeth) is spline-coupled to the right end of the countershaft 11 and is meshed with a second large-diameter speed-increasing gear 14 (having a number $X_2$ of teeth $(X_1<X_2)$) which is integrally formed on the left end of the right axle $1_R$, and thus, the countershaft 11 is rotated at a higher speed than that of the right axle $1_R$.

A first shifting gear 17 is relatively rotatably carried on a right portion of the countershaft 11 with a needle bearing 16 interposed therebetween, and is meshed with a second shifting gear 18 which is spline-coupled to the right end of the left axle $1_L$. The numbers of teeth $Y_1$ and $Y_2$ of the first and second shifting gears 17 and 18 are set at $Y_1<Y_2$, respectively. A third shifting gear 20 is relatively rotatably carried on a left portion of the countershaft 11 with a needle bearing 19 interposed therebetween, and is meshed with a fourth shifting gear 21 which is spline-coupled to the left portion of the left axle $1_L$. The numbers of teeth $Y_3$ and $Y_4$ of the third and fourth shifting gears 20 and 21 are set at $Y_3<Y_4$, respectively.

The structure of the first hydraulic clutch $3_R$ adapted to couple the first shifting gear 17 to the countershaft 11 will be described with reference to FIG. 3.

The first hydraulic clutch $3_R$ includes a clutch outer portion $22_R$ which is rotatable in unison with the first shifting gear 17, a clutch inner portion $23_R$ spline-coupled to the countershaft 11, a plurality of clutch plates $24_R$ slidably carried on the clutch outer portion $22_R$, a plurality of clutch disks $25_R$ slidably carried on the clutch inner portion $23_R$ and alternately superposed one upon the other, a pressure plate $26_R$ slidably spline-coupled to the clutch inner portion $23_R$ to bring the clutch plates $24_R$ and the clutch disks $25_R$ into pressure contact with one another, and a clutch spring $27_R$ compressed between the pressure plate $26_R$ and the clutch inner portion $23_R$.

A main piston $29_R$, a reaction piston $30_R$ and an assist piston $31_R$ are axially disposed in an annular cylinder $28_R$ formed in the center housing 4, and a thrust bearing $32_R$ is disposed between the main piston $29_R$ and the clutch disk $25_R$ disposed at an end. A first clutch oil chamber $33_R$ is defined between the assist piston $31_R$ and a bottom of the cylinder $28_R$, and a second clutch oil chamber $34_R$ is defined between the main piston $29_R$ and the reaction piston $30_R$ to communicate with the first clutch oil chamber $33_R$.

Figure 4:
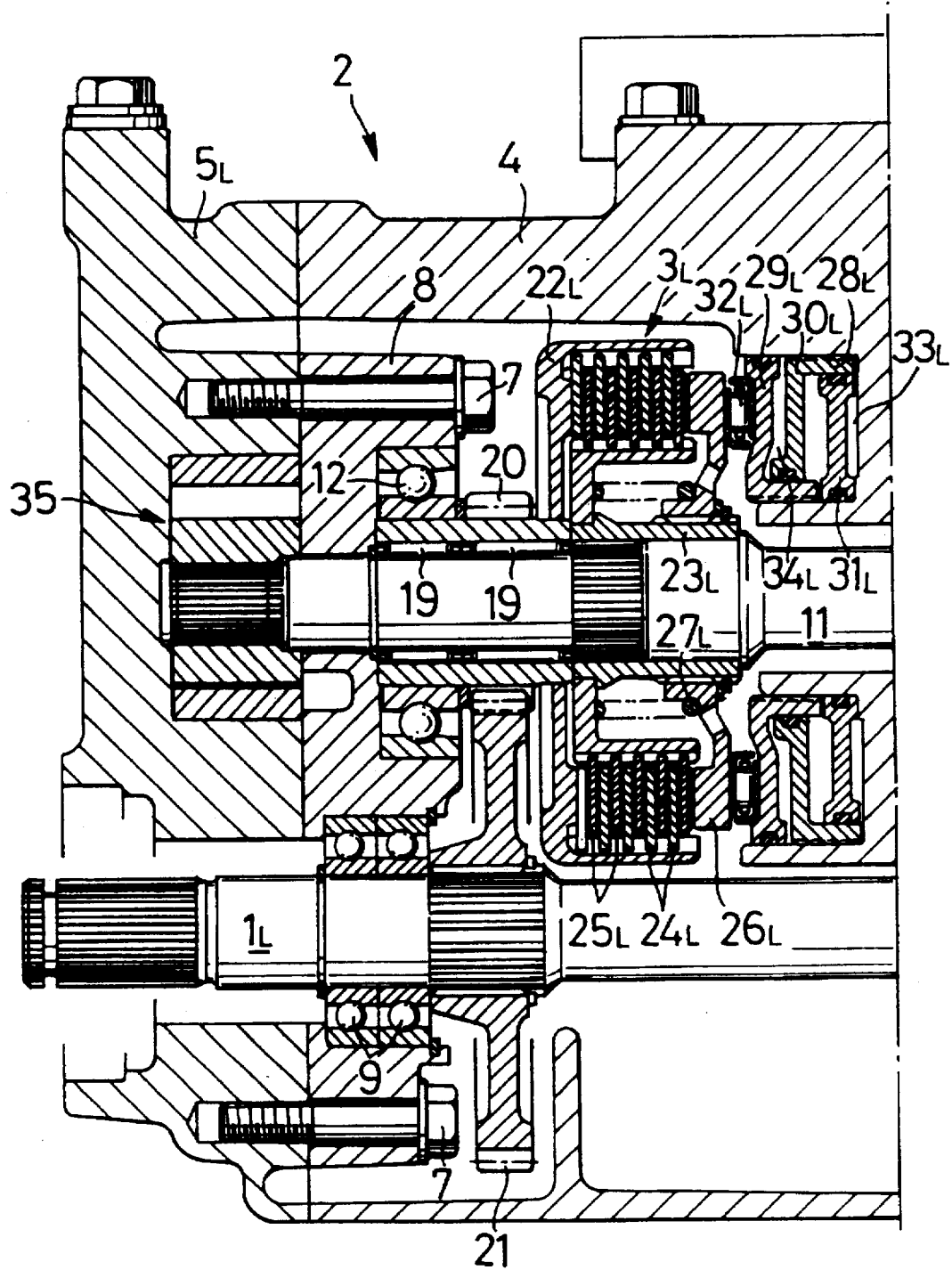
FIG. 4 is a sectional view of left half of the gearbox.

The structure of the second hydraulic clutch $3_L$ shown in FIG. 4 is substantially mirror-symmetrical with the structure of the first hydraulic clutch $3_R$ and hence, the repeated description thereof is omitted. Each of the characters affixed to the members or portions of the second hydraulic clutch $3_L$ has a suffix "$_L$" substituted for a suffix "$_R$" attached to each of the characters affixed to the corresponding members or portions of the first hydraulic clutch $3_R$.

A hydraulic pump 35 is mounted in such a manner that it is sandwiched between the pump cover 8 and the left housing $5_L$, and an oil discharged from the hydraulic pump is supplied via a hydraulic circuit to the first and second hydraulic clutches $3_R$ and $3_L$ and the first clutch oil chambers $33_R$ and $33_L$.

The working oil supplied to the first clutch oil chamber $33_R$ in the first hydraulic clutch $3_R$ is also transmitted to the second clutch oil chamber $34_R$, and a resultant force of an urging force of the assist piston $31_R$ and an urging force of the main piston $29_R$ is applied to the pressure plate $26_R$ through the thrust bearing $32_R$ to bring the clutch plates $24_R$ and the clutch disks $25_R$ into pressure contact with one another. As a result, the first shifting gear 17 is coupled to the countershaft 11 through the clutch outer portion $22_R$, the clutch plates $24_R$, the clutch disks $25_R$ and the clutch inner portion $23_R$. Likewise, when the working oil is supplied to the first clutch oil chamber $33_L$ in the second hydraulic clutch $3_L$, the third shifting gear 20 is coupled to the countershaft 11.

When the first hydraulic clutch $3_R$ is brought into an engaged state, the right axle $1_R$ is connected to the left axle $1_L$ through the second speed-increasing gear 15, the first speed-increasing gear 14, the countershaft 11, the first hydraulic clutch $3_R$, the first shifting gear 17 and the second shifting gear 18. At this time, the speed-increasing degree in the transmission of the rotation from the first shifting gear 15 to the first speed-increasing gear 14 is set greater than the speed-decreasing degree in the transmission of the rotation from the first shifting gear 17 to the second shifting gear 18 and hence, the number of revolutions of the left rear wheel $W_{RL}$ is increased relative to the number of revolutions of the right rear wheel $W_{RR}$. Thus, if the first hydraulic clutch $3_R$ is brought into its engaged state, for example, during straight traveling of the vehicle, the number of revolutions of the right rear wheel $W_{RR}$ is decreased, while the number of revolutions of the left rear wheel $W_{RL}$ is increased.

If the second hydraulic clutch $3_L$ is brought into its engaged state, the left axle $1_L$ is connected to the right axle $1_R$ through the fourth shifting gear 21, the third shifting gear 20, the second hydraulic clutch $3_L$, the countershaft 11, the first speed-increasing gear 14 and the second speed-increasing gear 15. At this time, the speed-increasing degree in the transmission of the rotation from the fourth shifting gear 21 to the third shifting gear 20 is set greater than the speed-increasing degree in the transmission of the revolutions from the first shifting gear 14 to the second speed-increasing gear 15 and hence, the number of revolutions of the right rear wheel $W_{RR}$ is increased relative to the number of revolutions of the left rear wheel $W_{RL}$. Thus, if the second hydraulic clutch $3_L$ is brought into its engaged state, for example, during straight traveling of the vehicle, the number of revolutions of the left rear wheel $W_{RL}$ is decreased, while the number of revolutions of the right rear wheel $W_{RR}$ is increased.

Engagement forces of the first and second hydraulic clutches $3_R$ and $3_L$ can be continuously controlled by adjusting the magnitudes of pressures applied to the clutches and therefore, the ratio of the number of revolutions of the left rear wheel to the number of revolutions of the right rear wheel can be continuously controlled within a range determined by a ratio of teeth of the gears 14, 15, 17, 18, 20 and 21.

Returning to FIG. 1, the following signals are inputted to an electronic control unit U to which the first and second hydraulic clutches $3_R$ and $3_L$ are connected: a signal from a lateral acceleration sensor $S_1$ for detecting a lateral acceleration of the vehicle; a signal from a steering angle sensor $S_2$ for detecting a rotational angle of steering wheel 36; a signal from an intake pipe internal absolute pressure sensor $S_3$ for detecting an internal absolute pressure in an intake pipe of the engine E; a signal from an engine revolution-number sensor $S_4$ for detecting a number of revolutions of the engine E; and signals from wheel speed sensors $S_5$, $S_6$, $S_7$ and $S_8$ for detecting numbers of revolutions of the four wheels, respectively.

The operation of the embodiment of the present invention having the above-described construction will be described below.

The electronic control unit U calculates the turning amount of the vehicle from the lateral acceleration of the vehicle detected by the lateral acceleration sensor $S_1$, the rotational angle of the steering wheel 36 detected by the steering angle sensor $S_2$ and the wheel speeds of the rear wheels $W_{RL}$ and $W_{RR}$ detected by the wheel speed sensors $S_7$ and $S_8$. The electronic control unit U further calculates an engine torque from outputs of the intake pipe internal absolute pressure sensor $S_3$ and the engine revolution-number sensor $S_4$ and calculates a torque distributed to the left and right rear wheels $W_{RL}$ and $W_{RR}$ from the engine torque, the wheel speeds of the front wheels $W_{FL}$ and $W_{FR}$ detected by the wheel speed sensors $S_7$ and $S_8$ and the turning amount of the vehicle. Thus, the engagement forces of the first and second hydraulic clutches $3_R$ and $3_L$ are in accordance with the distributed torque.

When the vehicle is traveling at a low or medium speed, a braking force is applied to an inner one of the left and right rear wheels $W_{RL}$ and $W_{RR}$ and a driving force is applied to an outer one of the left and right rear wheels $W_{RL}$ and $W_{RR}$ during turning of the vehicle, in order to enhance the turning performance. To this end, when the vehicle is turned in a counterclockwise direction, the number of revolutions of the right rear wheel $W_{RR}$ (the outer wheel during turning of the vehicle) is increased, while the number of rotations of the left rear wheel $W_{RL}$ (the inner wheel during turning of the vehicle) is decreased, by bringing the second hydraulic clutch $3_L$ into engagement. When the vehicle is turned in a clockwise direction, the number of revolutions of the right rear wheel $W_{RR}$ (the inner wheel during turning of the vehicle) is decreased, while the number of revolutions of the left rear wheel $W_{RL}$ (the outer wheel during turning of the vehicle) is increased, by bringing the first hydraulic clutch $3_R$ into engagement.

If the number of revolutions of the outer wheel during turning of the vehicle is increased and the number of revolutions of the inner wheel is decreased in the above manner, a driving force is generated in the outer wheel having the increased number of revolutions, and a braking force is generated in the inner wheel having the decreased number of revolutions. The magnitudes of the driving force and the braking force are equal to a torque transmitting capacity transmitted by the first or second hydraulic clutch $3_R$ or $3_L$ which is in the engaged state.

When the vehicle is traveling straight ahead, the countershaft 11 connected to the right axle $1_R$ through the first speed-increasing gear 14, and the second speed-increasing gear 15 is rotated at a speed higher than that of the right axle $1_R$ and hence, the hydraulic pump 35 mounted on the countershaft 11 is driven at high speed, as compared with the case where the hydraulic pump 35 is mounted on the right axle $1_R$ (or the left axle $1_L$). Thus, even during traveling of the vehicle at a low vehicle speed, a sufficient amount of oil discharged from the hydraulic pump 35 can be insured, and the first and second hydraulic clutches $3_R$ and $3_L$ can be reliably operated. Moreover, since the hydraulic pump 35 is mounted within the gearbox 2, oil passages connecting the hydraulic pump 35 to both of the hydraulic clutches $3_R$ and $3_L$ can be shortened.

The countershaft 11, on which the first and second hydraulic clutches $3_R$ and $3_L$ are mounted, is rotated at a speed higher than those of the left and right axles $1_L$ and $1_R$ and hence, the torque capacity to be transmitted by the first and second hydraulic clutches $3_R$ and $3_L$ is also smaller. Therefore, the first and second hydraulic clutches $3_R$ and $3_L$ can be reduced in size to reduce the size of the entire gearbox 2.

Further, the first and second hydraulic clutches $3_R$ and $3_L$ having a larger size are disposed back-to-back, and the first and third shifting gears 17 and 20 having a smaller size are disposed on the opposite sides of the first and second hydraulic clutches $3_R$ and $3_L$. Therefore, the first and second hydraulic clutches $3_R$ and $3_L$ and the first and third shifting gears 17 and 20 can be disposed in a compact lay-out to provide a reduction in size of the gearbox 2. Moreover, the outer diameters of the first and third shifting gears 17 and 20, respectively, are less than those of the first and second hydraulic clutches $3_R$ and $3_L$ and hence, the radial sizes of the first and second hydraulic clutches $3_R$ and $3_L$ can be reduced, as compared with the case where the first and third shifting gears 17 and 20 are mounted around the outer peripheries of the clutch outer portions $22_R$ and $22_L$.

Although the embodiment of the present invention has been described in detail, it will be understood that the present invention is not limited to the above-described embodiment, and various modifications may be made without departing from the subject matter and scope of the invention defined in claims.

For example, the system for generating the difference between the wheel speeds of the follower wheels has been described in the embodiment, but the present invention is also applicable to a system for generating a difference between wheel speeds of the driven wheels. In addition, the present invention is further applicable to a system for generating a difference between wheel speeds of driven wheels in a vehicle in which an auxiliary driving source such as an electric motor is connected to follower wheels, so that upon slipping of driven wheels, the auxiliary driving source is operated to provide a four-wheel drive state. Further, in place of the first and second hydraulic clutches $3_R$ and $3_L$, another clutch such as an electromagnetic clutch, a fluid coupling or the like can be employed.

What is claimed is:

1. A system for generating a difference in speed between left and right wheels of a vehicle, by connecting the left and right wheels to each other by a gearbox, wherein said gearbox includes:

a countershaft disposed parallel to axles of said left and right wheels;

first and second speed-increasing gears for increasing the number of revolutions of one of said axles to transmit the rotation of the one axle to said countershaft;

a first shifting gear relatively rotatably carried on said countershaft;

a second shifting gear fixedly mounted on the other axle and meshed with said first shifting gear;

a third shifting gear relatively rotatably carried on said countershaft;

a fourth shifting gear fixedly mounted on said other axle and meshed with said third shifting gear;

a first clutch mounted on said countershaft for coupling said first shifting gear to said countershaft; and a second clutch mounted on said countershaft for coupling said third shifting gear to said countershaft, said first and second clutches being disposed adjacent each other between said first and third shifting gears.

2. A system for generating a difference in speed between left and right wheels of a vehicle according to claim 1, wherein an outer diameter of said first shifting gear is less than an outer diameter of a clutch outer portion of said first clutch, and an outer diameter of said third shifting gear is less than an outer diameter of a clutch outer portion of said second clutch.

3. A system for generating a difference in speed between left and right wheels of a vehicle according to claim 1, further including a hydraulic pump for supplying a working oil to said first and second clutches, said hydraulic pump being driven by said countershaft.

4. A system for generating a difference in speed between left and right wheels of a vehicle according to claim 1, wherein outer diameters of said first and third shifting gears are different from each other.

5. A system for generating a difference in speed between left and right wheels of a vehicle according to claim 1, wherein said left and right wheels are follower wheels.

* * * * *